United States Patent
Chaudhri et al.

(10) Patent No.: US 8,150,328 B2
(45) Date of Patent: Apr. 3, 2012

(54) METHOD AND APPARATUS FOR DISTRIBUTED SENSING MANAGEMENT AND CONTROL WITHIN A COGNITIVE RADIO NETWORK

(75) Inventors: Apoorv Chaudhri, Sunrise, FL (US); Oleg Andric, West Palm Beach, FL (US); Yadunandana N. Rao, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 595 days.

(21) Appl. No.: 12/212,101

(22) Filed: Sep. 17, 2008

(65) Prior Publication Data

US 2010/0069013 A1 Mar. 18, 2010

(51) Int. Cl.
*H04B 17/00* (2006.01)
(52) U.S. Cl. ....... 455/67.11; 455/68; 455/434; 455/513; 370/278
(58) Field of Classification Search ............ 455/62, 455/67.11, 68, 434, 513, 515
See application file for complete search history.

(56) References Cited

U.S. PATENT DOCUMENTS

| | | | |
|---|---|---|---|
| 2004/0087310 A1 | 5/2004 | Williamson et al. | |
| 2007/0032254 A1 | 2/2007 | Chen | |

FOREIGN PATENT DOCUMENTS

| | | | |
|---|---|---|---|
| KR | 20070052229 A | 5/2007 | |
| WO | 2007043827 A1 | 3/2007 | |

OTHER PUBLICATIONS

Danijela Cabric, Shridhar Mubaraq Mishra and Robert W. Brodersen—"Implementation Issues in Spectrum Sensing for Cognitive Radios"—IEEE, 2004—pp. 772-776.
Steve Shellhammer—"The Spectrum Sensing Function"—IEEE 802.22-07/0052r0l—Wireless RANs—Jan. 2007—Slides 1-24.
Steve Shellhammer—"The Spectrum Sensing Function"—IEEE 802.22-07/0074rl—Wireless RANs—Feb. 2007—11 pages.
Corresponding International Application No. PCT/US2009/054131—International Search Report with Written Opinion mailed Mar. 23, 2010.

*Primary Examiner* — Tuan H Nguyen
(74) *Attorney, Agent, or Firm* — Barbara R. Doutre

(57) ABSTRACT

A technique for spectrum sensing management and control for a secondary communication system seeking to utilize another communication system's spectrum is provided (600). Sensor control data is sent from a base station to subscriber units (604). Sensing measurements are taken and sent back to the base station for ranking (608) as sensed feedback information. Comparisons of the sensed feedback information are made to each other and to thresholds aligned with the types of measurements taken (610). An initial ranked channel list is generated (612). Weighting of the initial ranking list and secondary ranking list is followed by re-ranking the channels according to the weighting into a final ranking list (612). The final ranking list is transmitted to the mobile units to enable operation within the other communication system's spectrum within interfering with that system (614). The weighting is based on the type of sensing measurement taken as opposed to the channel.

25 Claims, 7 Drawing Sheets

| FIG. 5A |
|---|
| FIG. 5B |

FIG. 5

| RANKING PARAMETER (502) | DESCRIPTION (504) | VALUE (506) | VALUE TYPE (508) | SOURCE (510) |
|---|---|---|---|---|
| MAXIMUM CHANNEL TX POWER ALLOWED (512) | MAX CHANNEL TX POWER ALLOWED BASED ON GEO-LOCATION DATABASE | MAX TX POWER | CONTINUOUS | POLICY ENGINE |
| USABLE CHANNEL BANDWIDTH (514) | CHANNEL BW BASED ON REGULATORY POLICY AND SENSING | CHANNEL BW | CONTINUOUS | POLICY ENGINE AND COOPERATIVE SENSING ENGINE |
| SERVICE REQUIREMENT (516) | SYSTEM/NETWORK/APPLICATION PROVIDES SERVICES THAT REQUIRE PARTICULAR TX POWER, NUMBER OF USERS SUPPORTED, BW | REQUIRED TX POWER + REQUIRED BW | CONTINUOUS; CONTINUOUS | UMAC |
| RADIOMETRIC MEASUREMENT (518) | ENERGY MEASUREMENT OF THE ENTIRE CHANNEL | ENERGY LEVEL | CONTINUOUS | COOPERATIVE SENSING ENGINE |
| RADIOMETRIC MEASUREMENT (520) | ENERGY MEASUREMENT OF THE SUBCHANNEL (WIRELESS MICROPHONE) (WM) | ENERGY LEVEL + WM DETECTED | CONTINUOUS + DISCRETE | COOPERATIVE SENSING ENGINE |
| AGE OF RADIOMETRIC MEASUREMENT (522) | ELAPSED TIME SINCE THE MEASUREMENT WAS TAKEN | ELAPSED TIME (INVERSELY PROPORTIONAL TO MEASUREMENT RELIABILITY) | CONTINUOUS | SME |
| MATCH FILTER MEASUREMENT (524) | MATCH FILTER MEASUREMENT OF DTV PILOT SIGNAL | ENERGY LEVEL + DTV PILOT DETECTED | CONTINUOUS + DISCRETE | COOPERATIVE SENSING ENGINE |

| | | | |
|---|---|---|---|
| 526 | AGE OF MATCH FILTER MEASUREMENT | ELAPSED TIME SINCE THE MEASUREMENT WAS TAKEN | ELAPSED TIME (INVERSELY PROPORTIONAL TO MEASUREMENT RELIABILITY) | CONTINUOUS | SME |
| 528 | DELAY MULTIPLY MEASUREMENT | DELAY MULTIPLY MEASUREMENT FOR OFMD DETECTION | OFDM SIGNAL DETECTED | DISCRETE | COOPERATIVE SENSING ENGINE |
| 530 | AGE OF DELAY MULTIPLY MEASUREMENT | ELAPSED TIME SINCE THE MEASUREMENT WAS TAKEN | ELAPSED TIME (INVERSELY PROPORTIONAL TO MEASUREMENT RELIABILITY) | CONTINUOUS | SME |
| 532 | CHANNEL PREDICTABILITY | ENTROPY OF THE CHANNEL | CHANNEL ENTROPY | CONTINUOUS | SME |
| 534 | TYPE OF PRIMARY INCUMBENT | TYPE OF THE PRIMARY INCUMBENT OCCUPYING THE CHANNEL | TYPE OF PRIMARY INCUMBENT | DISCRETE | POLICY ENGINE |
| 536 | CHANNEL PROPAGATION CHARACTERISTICS | CHANNEL DELAY SPREAD AND INTERFERENCE | CHANNEL PROPAGATION CHARACTERISTICS | CONTINUOUS | POLICY ENGINE AND COOPERATIVE SENSING ENGINE |
| 538 | OPERATIONAL CHANNEL SEPARATION | SEPARATION OF THE CHANNEL FROM OTHER CHANNELS IN USE BY THE PRIMARY INCUMBENT OR SECONDARY USERS | CHANNEL SEPARATION | CONTINUOUS | POLICY ENGINE AND COOPERATIVE SENSING ENGINE |

*FIG. 5B*

METHOD AND APPARATUS FOR DISTRIBUTED SENSING MANAGEMENT AND CONTROL WITHIN A COGNITIVE RADIO NETWORK

FIELD OF THE INVENTION

The invention generally relates to communication systems and more particularly to cognitive radio (CR) networks and the management of spectrum sensing in CR networks to achieve optimum utilization of secondary spectrum.

BACKGROUND OF THE INVENTION

Wireless products and services have continued to expand to the point that finite resources of available communication spectrum are being overwhelmed. Industry has been forced to make dramatic changes, as it must adapt to accommodate the exponential demand on spectrum access, efficiency and reliability.

The Federal Communications Commission (FCC) in the United States, and its counterparts around the world, allocate radio spectrum across frequency channels of varying bandwidth. Various bands may cover, for example, AM radio, VH television, cellular phones, citizen's-band radio, pagers and so on. As more devices go wireless, an increasingly crowded amount of radio spectrum needs to be shared. Although the radio spectrum is almost entirely occupied, not all devices use portions of the radio spectrum at the same time or location. At certain times, a large percentage of the allocated spectrum may be sitting idle, even though it is officially accounted for. Regulatory authorities are beginning to permit usage of allocated spectrum on a secondary basis under certain strict constraints. For example, the FCC is beginning to permit the secondary usage of channels 21-51, also known as TV white space.

Cognitive radio is a term used to describe a suite of technologies with the potential to significantly alter the manner in which spectrum is utilized by future radio systems. A paradigm for wireless communication in which either a network or wireless device alters its transmission or reception parameters to avoid inference with licensed or unlicensed incumbent users, cognitive radio implements measures to avoid selecting an occupied frequency, so as to avoid interference that can possibly damage the incumbent device and/or reduce its signal reception quality. The alteration of parameters is based on active monitoring of several factors in the external and internal radio environment, such as radio frequency usage, user behavior and network state. Cognitive radio operation in TV White Space is strictly conditional on reliable detection of occupied and unoccupied spectrum and is also conditional on fast network recovery in the case of in-band incumbent detection.

Attempts to detect an incumbent system have included the use of sensing techniques. Despite advances in sensor technologies, no single sensor is capable of obtaining all the required information reliably, at all times, in often dynamic environments, such as public safety environments including firefighting, law enforcement and search and rescue to name a few. Moreover, the varying degrees of uncertainty inherent in a sensor system and the practical reality of occasional sensor failure, results in a lack of confidence in single sensor measurements. This lack of confidence in single sensor systems has led to the use of co-operative sensing techniques capable of utilizing the distributed sensing gain. The disadvantages associated with past cooperative sensing techniques have historically been: delay in decision; excessive use of control channel bandwidth; and the inability to accurately identify malicious nodes.

Accordingly, it is highly desirable to implement a CR network having optimized spectrum sensing management and control in a cognitive radio network.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 5A and 5B is an example of various parameters and variables that can be used to rank channels in accordance with an embodiment of the invention.

Figure 1:
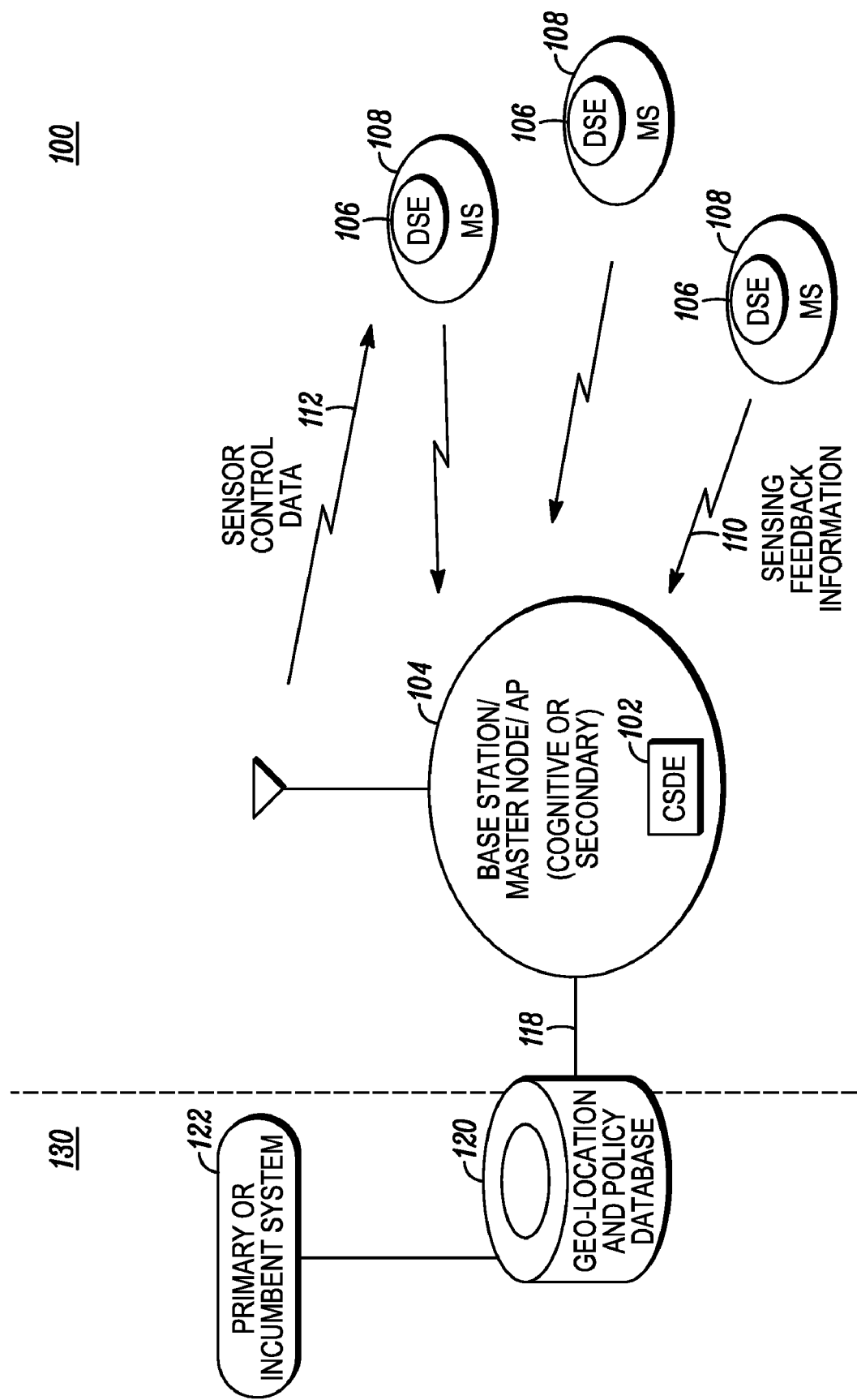
FIG. 1 is a system diagram showing a cognitive radio system and incumbent system operating in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related spectrum sensing management and control techniques.

The spectrum sensing management and control technique of the present invention provides control and secondary channel selection based on distributed spectrum sensing with and without a dedicated sensing RF front end, using an over-the-air sensing control interface, in-band and out-of-band sensing, master-slave sensing nodes and secondary channel ranking techniques. Spectrum sensing management, provided in accordance with the various embodiments to be described herein, is implemented within a cognitive system to efficiently and intelligently control and obtain spectrum sensing data from radio sensors under cognitive radio control.

For the purposes of this application certain acronyms, abbreviations and definitions are provided below:
1) primary channel: a channel in the licensed spectrum of a cognitive radio (CR) network (e.g. 4.9 GHz).
2) primary user: licensed user of a band (or user of an unlicensed band which can be opportunistically used by the CR network);

3) secondary channel: a channel in licensed (e.g. TV) or unlicensed spectrum which can be opportunistically used by the CR network on a secondary basis;
4) secondary user: sub-licensed or unlicensed user of a band;
5) spectrum sensing: process of detecting an incumbent in a spectrum.
6) in-band spectrum: the frequency band occupied by the active channel of a CR network for transmission and reception of data along with other adjacent channels potentially affected by the CR network transmissions;
7) in-band sensing: sensing performed by the CR to detect a primary user of the spectrum on active along with other adjacent channels affected by CR network transmissions;
8) spectrum opportunity: a band of frequency not used by the primary user of the band and can be used by a secondary user without causing interference to the primary user, also known as spectrum/spectral opportunity;
9) out-of-band spectrum: the frequency band not occupied by the active/serving/operating channel of a CR network for transmission and reception of data along with other adjacent channels affected network transmissions;
10) out-of-band sensing: sensing performed by the CR to keep track of spectrum opportunities capable of being reused by the CR;
11) active channel: the secondary channel on which the CR network is currently operating on and the CR mobile is currently communicating with the CR access point (AP);
12) alternate channel: a non-active secondary channel, which can potentially be used by the CR network for operation
13) channel list: a set of active and alternate channels;
14) quiet period: a scheduled time period, generally coordinated by the CR AP, where all CR devices stop transmitting and sense radio channels to detect primary and/or secondary systems;
15) signal quality: a measure of goodness of a channel, typically quantified by SINR (or RSSI) of the channel, other factors may also be included in determining signal quality;
16) spectral white space: a space in spectrum/band not used by the primary user;

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As discussed in the Background, cognitive radio (CR) communication is strictly conditional on reliable detection of unoccupied spectrum and non-interfering utilization of spectrum opportunities as well as fast network recovery in case of in-band incumbent detection. In accordance with the embodiments of the invention to be described herein, sensing management and control provides utilization of spectrum on a secondary basis without interference to a primary user by reliable and fast detection of a primary incumbent. The sensing management and control of the present invention also provides fast network recovery based on fast channel selection and channel change which are realized by maintaining a list of secondary spectrum opportunities which can be used to select the best channel for network operation in case of in-band incumbent detection.

The interpretation of spectrum sensing measurements and sensing environment is extremely important for reliable detection. The utilization of distributed sensors, in accordance with embodiments of the invention, extracts information from the network environment via improved interpretation of sensor data and improved control of the sensors. The advantages of cooperation include reduced false alarms based on centralized decisions and decentralized sensing; reduced misses in detection; and high processing gain. The ranking and management technique of the present invention makes use of the advantages of cooperative sensing while minimizing the disadvantages discussed previously in the Background.

To achieve distributed spectrum sensing ranking and management in accordance with the present invention, several factors are taken into account, including understanding the sensor environment, channel ranking and optimum channel selection. Firstly, understanding the sensor environment involves the nature of the measurement, the limitation of individual sensors and the sensor system as a whole, particularly probabilistic understanding of the sensor in terms of measurement uncertainty leading to control and optimum utilization of individual sensors in a system. Secondly, channel ranking is based on a combination of all available relevant information in a consistent and coherent manner. All spectrum opportunities are ranked based on a single estimate of the state of the channels in the sensing set, given the inherent uncertainty in sensor measurements. If there are several sensing options or configurations, the one making the best use of distributed sensor and network resources is chosen to sense in-band and out-of-band channels based on channel ranking. Finally, the list of ranked secondary channel can be used to select the best channel for operation in case of in-band incumbent detection or interference.

Referring to FIG. 1, there is shown a block diagram of a cognitive radio network 100 operating in accordance with an embodiment of the invention. Cognitive radio network 100 is seeking to utilize spectrum dedicated to another system, that system being either an incumbent or primary system 122. In accordance with this embodiment, the CR network 100 provides a distributed sensor system operating in a cooperative fashion. CR network 100 includes a base station operating as a master node or access point (AP) 104 with a centralized decision sensing engine (CSDE) 102. The CR network further includes a plurality of mobile subscribers (MS) 108 operating as slave nodes, each with a decentralized sensing engine (DSE) 106. The CSDE 102 and the DSE 106 represent controller functionality which runs the spectrum sensing management and control technique of the present invention. The MSs 108 may be geographically spread out and mobile over all or part of the network. The CSDE 102 communicates with the DSE 106 using a predefined air interface. The DSE 106 of each mobile subscriber 108 adapts its sensor configuration based on sensor control data 112 (also referred to as sensor control information) received from the CSDE 102 and sends back sensor feedback information 110 in response thereto.

Cognitive radio network 100 with its distributed DSEs 106 provides: sensing data interpretation and representation of the sensed data; optimized control of channel bandwidth utilized for sensor control; sensor management and control for reliable and fast channel detection; and maximization of system resources, by optimum scheduling of quiet periods.

Briefly, the operation begins by the CSDE 102 transmitting a channel list and sensor control information from the CR base station 104 to each mobile CR mobile subscriber 108. The channel list may be obtained from the geo-location database 120 or could be a previously stored channel list within the base station 104. The sensor control information includes information as to which channel the CR mobile subscriber sensor should sense, how often the sensor should sense, sensor configuration and identifies a technique with which the sensor should sense. The DSE 106 of each CR subscriber 106 receives the sensor control data and channel list and provides sensed channel information as feedback in response thereto.

The CSDE 102 receives the sensed channel information and iteratively scans, ranks, and manages the ranking of channels in the channel list to provide the highest ranked set of channels in conjunction with updated sensor control information. This updated channel list and sensor control information is sent back to the CR mobile subscriber 108 to enable operation within the incumbent network 130 spectrum.

The sensor control information may further provide a schedule for quiet periods within which the CR mobile subscribers sense both in-band and out-of-band channels regardless of ranking. This quiet period scheduling will be further described in conjunction with FIG. 7. The updated sensor control information is determined based on link metadata, policy metadata, and cooperative metadata generated as part of the CSDE and DSE as will be described in conjunction with the description of FIG. 2.

The sensor control data 112 from CSDE notifies the DSE within the mobile subscribers 108 of the set of channels to be sensed along with sensor configuration information. The sensor configuration information includes a spectrum opportunity list of where the sensor is to sense (i.e. which channel frequency and bandwidth), when the sensor will sense (i.e. how often), and how the sensor should sense (algorithm, targeted primary/secondary systems). The sensor configuration further includes information to be shared and identifies the type of information (i.e. information that is variable, such as signal strength, noise levels to name a few or information that is static). An identification of the type of incumbent to be detected (e.g. DTV, Wireless Microphone, OFDM, P25, Digital, Analog) is also included amongst the sensor configuration information. The sensor configuration also consists of the sensor RF configuration, sensing algorithms and settings to be used, and information such as location, velocity and measurement confidence. The sensing control further controls the sensing resources consisting of quiet period duration and rate. The CSDE 102 also provides intersystem cooperation strategies, sensor data fusion and detection methods, and identification of malicious sensing elements.

The decentralized sensing engine (DSE) 106 runs on each mobile subscriber 108 and is responsible for calculating the sensing feedback information for each frequency identified by the CSDE 102. For example, the DSE 106 can be directed by the CSDE 102 to provide radiometric information for a set of frequencies, time periods, or calculate a correlation factor, etc. The DSE 106 of each mobile subscriber also adapts its sensor based on sensor configuration received as part of the sensing control data 112 received from the CSDE. Thus, the DSE provides more than just channel detection, the DSE sends back information that can be used to rank spectrum opportunities.

The in-band channel is the channel that requires the most reliable sensing in order to detect the primary channel occupant, interference or any other kind of communication disruption that can be caused to the primary user. When a primary user is detected, the in-band channel must be vacated as fast as possible. Any high interference which might cause communication disruption or degradation to the point that the CRs 108 might not be able to use the channel is also reason to vacate the channel. Degradation may occur in the whole geographic area of the CR network 108 or in just part of the area that the CRs use. In either case, the channel needs to be vacated. The use of cooperative sensing and sensor control as outlined above provides the advantage of being able to operate CR systems with highly geographically spread out devices.

Figure 2:
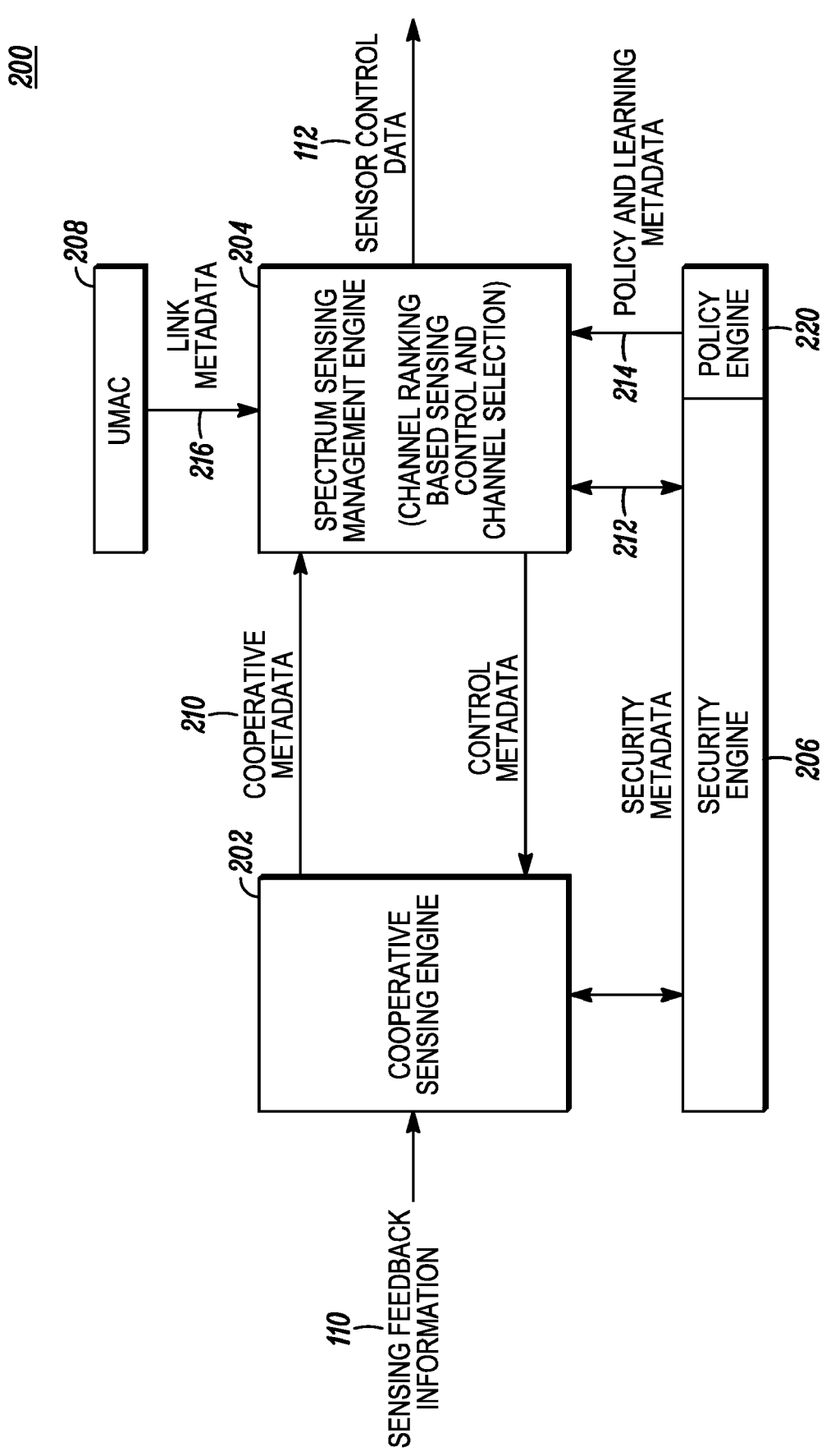
FIG. 2 shows a signal processing diagram in accordance with an embodiment of the invention.

FIG. 2 shows a signal flow and processing diagram in accordance with an embodiment of the invention. For the purposes of this application, cognition engine is considered the brain of the cognitive radio. Spectrum sensing management is the main component of the cognition engine responsible for adapting and optimizing radio parameters such as frequency, modulation etc. for optimum utilization of spectrum. The elements of signal diagram 200 may be included within the base station 104 as part of the CSDE 104 and/or as part of the geo-location database 120. Likewise geo-location database 120 may be integrated as part of the base station 104 or separate.

Included within signal treatment diagram 200 are cooperative sensing engine 202, security engine 206, policy engine 220 and UMAC (Medium Access Control) 208 all interoperatively controlled by spectrum sensing management engine (SME) 204. The cooperative sensing engine 202 provides estimates of channel parameters and channel state, for all channels sensed by the mobile subscribers and base station based on the sensing feedback information, sensor capability and sensor state. The cooperative sensing engine 202 performs the sensing data fusion and detection functions which combine the sensing results received as part of sensor feedback information from various CR devices based on for example age and various weightings of measurements.

Various types of data are generated within the signal flow and processing of the sensing feedback information 110 and sensor control data 112. The processing of sensing feedback information 110 through cooperative sensing engine 202 generates cooperative metadata 210 may include the number of channels sensed, list of channels sensed, sensing results, such as power measured in the channel, and type of signal detected. Link metadata 216 may include signal quality error (SQE) of the channel currently used by the CR network, current system bandwidth requirements, and required transmit power for a viable system. Policy metadata 214 may include the number of channels available for potential opportunistic use, list of channels available for potential opportunistic use, spectrum utilization policy consisting of transmit mask requirements, maximum allowed transmit power based on geo-location etc.

Table 1 provides an example of an initial set of cooperative control metadata provided to Cooperative Sensing Engine 202, for reference.

| Name | Description |
| --- | --- |
| Signal Of Interest | WM, DTV, OFDM |
| Signal to noise ratio (SNR) | |
| Decision Method | Variable or Static |
| Combining Method | Geometric mean |
| Sensing Algorithm | Radiometric, matched filter, delay multiply |

The security engine 206 identifies false sensor data and malicious sensors/mobiles. The security engine 206 facilitates cooperative sensing 202 by ensuring accuracy and robustness in accordance with policy engine 220. The spectrum sensing management engine 204 provides the channel selection based on secondary channel ranking.

In operation, the cooperative sensing engine 202 receives the mobile subscriber's feedback information 110 consisting of sensing results. The security engine 206 checks the feedback information for validity conjunction with policy data to ensure validity and robustness. The cooperative sensing engine 202 combines the sensing feedback information for each channel and generates cooperative metadata 210 based on sensor capability and state, and provides this to the spectrum sensing management engine 204 which ranks the channels and generates the sensor control data 112.

The spectrum sensing management engine 204 is responsible for spectrum sensing, managing system resources (e.g. scheduling quiet periods), distributed sensor management and control based on spectrum opportunity set ranking (i.e. secondary channel ranking). The spectrum sensing management engine (SME) 204 is also responsible for sensor management, sensor control and resource planning based on cooperative metadata obtained from the cooperative sensing engine 202, policies and learning metadata 214 obtained from the policy portion 220 of security engine 206, and link metadata 216 obtained from the UMAC 208. The SME 204 provides sensing control data 112 to various mobile subscribers 108 for optimized sensing and scheduled quiet periods.

Table 2 provides an example of an initial set of link metadata obtained from UMAC 208, for reference.

| Name | Description |
| --- | --- |
| Serving Channel SQE | SQE of the currently used channel. |
| Required BW | Current system BW requirements |
| Required TX power | The required TX power for a viable system. |

Table 3 provides an example of an initial set of policy engine metadata obtained from the Policy Engine 220, for reference.

| Name | Description |
| --- | --- |
| Number of Channels | Number of channels available for potential opportunistic use. |
| Channel List | List of channels available for potential opportunistic use. |
| Maximum Allowed TX power | Maximum allowed TX power based on geo-location. |

Figure 3:
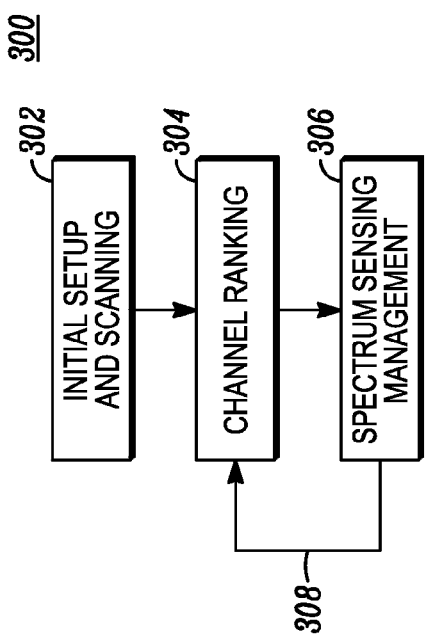
FIG. 3 is a flowchart of a channel ranking and management technique in accordance with an embodiment of the invention.

Referring to FIG. 3, there is shown a flowchart 300 used by the spectrum sensing management engine SME 204 in accordance with an embodiment of the invention. The initial list of opportunistic channels is obtained from the geo-location policy database and is used by the SME 204 to perform the initial scanning at 302. The initial scan of all opportunistic channels produces a rough snapshot of the channels' conditions, including sensing data such as signal-to-noise ratios, channel usage, channel propagation characteristics and so on. After the initial scan, the first channel ranking is performed at 304. The spectrum sensing management (SME) 204 determines the sensing control feedback as to which channels should be sensed by which devices, at what time periods and within which quiet periods (feedback 308). Process 300 is an iterative process, with the results of the sensing used to update the channel ranking, which in turn are used by the SME 204 to update the sensing control feedback and quiet period scheduling 308.

Figure 4:
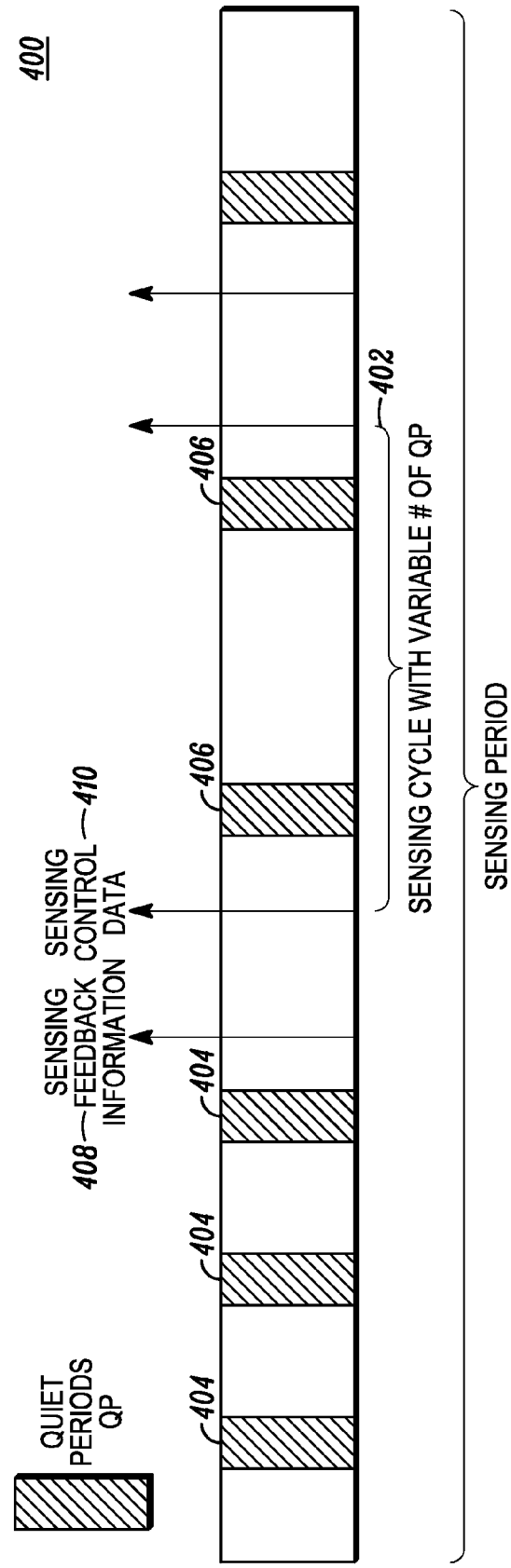
FIG. 4 is an example of a sensing period showing quiet periods in accordance with an embodiment of the invention.

FIG. 4 illustrates a generic timeline example resulting from the technique 300 of FIG. 3. Over a sensing period 400 various sensing cycles 420 are iteratively performed resulting in a variable number and length of quiet periods 404, 406. The transmission of sensing feedback information 408 by CR mobiles and transmission of sensing control data 410 by the CR base station occurs within the variable non-quiet periods.

Turning now to the channel ranking 304 aspect of the technique 300, the spectrum sensing management engine creates, maintains and updates the ranking list of the secondary channels. These rankings are updated based on the policy and learning metadata 214 from the policy engine 220 as well as the cooperative metadata 210 from the cooperative sensing engine 202 and the link metadata 216 from UMAC 208.

An example of an initial set of ranking parameters is provided in conjunction with the table 500 of FIGS. 5A and 5B. Table 500 includes a list of various ranking parameters 502 a description associated with each parameter 504, a value (such as time, power or channel separation) 506, the value type (continuous or discrete) 508 and the parameter source 510 (such as UMAC 208, sensing management engine 204, cooperative sensing engine 210 or policy engine 220 of FIG. 2).

The ranking parameters of Table 500 are listed as maximum allowed channel transmit power 512, usable bandwidth 514, service requirement 516, radiometric measurement 518, 520, age of the radiometric measurement 522 (where age of the radiometric measurement represents the time elapsed since the radiometric measurement had been taken), match filter measurement 524, (where match filter measurement represents the process of detection of the presence of a DTV signal) age of match filter measurement 526, delay multiple measurement 528 (where delay multiple measurement represents the process of detection of OFDM signals), age of delay multiply measurement 530, channel predictability 532, type of primary incumbent, 534, channel propagation characteristics 536 and operation channel separation 538.

Table 500 can be used to facilitate the understanding of upcoming flowcharts and the data being gathered therein. To briefly provide one example, consider ranking parameters maximum allowed transmit (TX) power 512. Moving across the Table the description 504 describes these parameters as the maximum allowed transmit power based on the geo-location database. Thus, the maximum allowed transmit power used by the base station 104 is stored in geo-location policy database 120.

Figure 6:
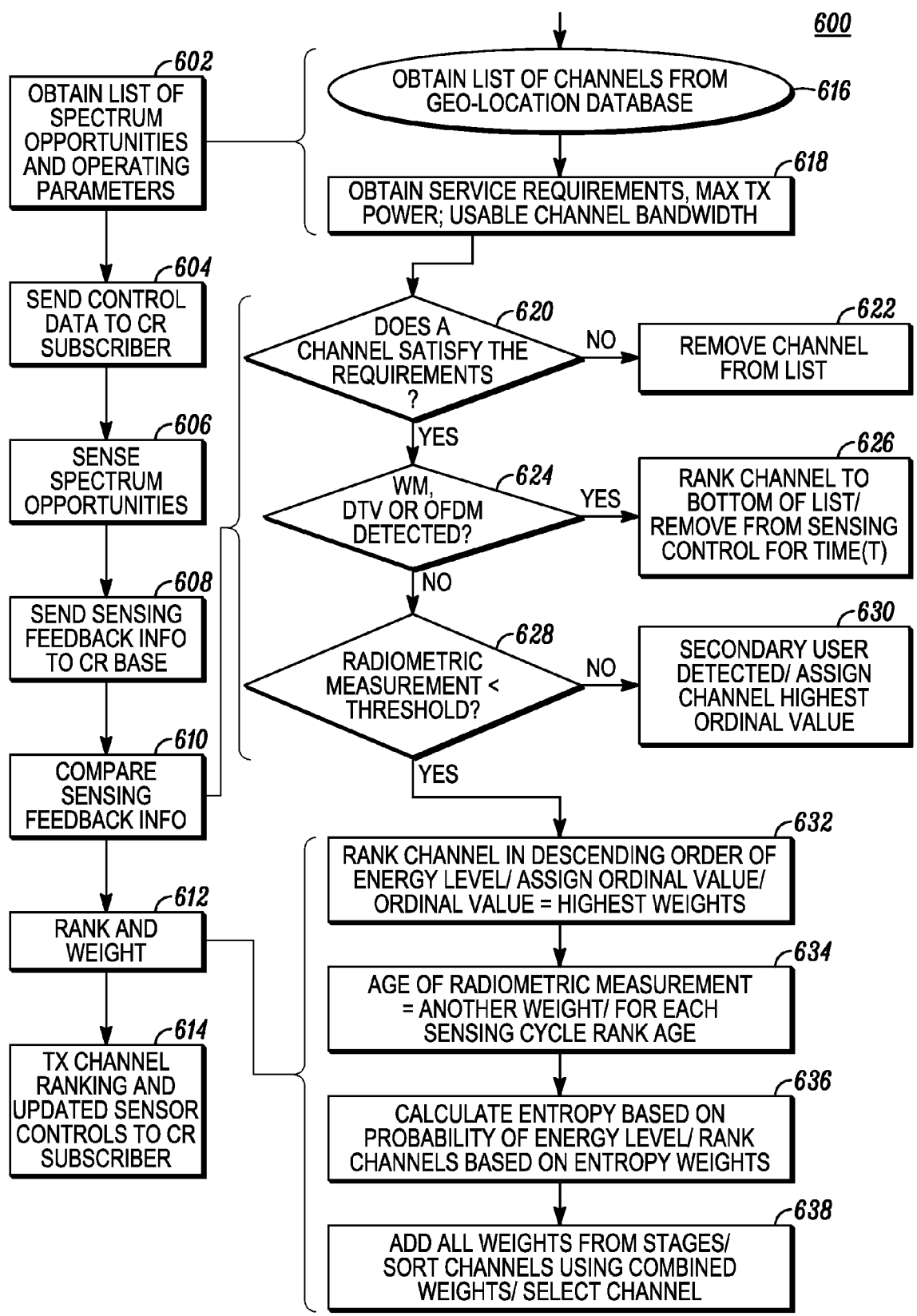
FIG. 6 is a flowchart of a multistage ranking technique in accordance with an embodiment of the invention.

Having discussed examples of the parameters and variables, the actual channel ranking and management technique shall now be addressed. Referring to FIG. 6, the ranking technique is shown at a high level (steps 602-614) in conjunction with more detailed examples of various implementation breakdowns (616-638). Running through the high level steps, the technique begins at step 602 by the base station obtaining a list of spectrum opportunities and predetermined operating parameters from a geo-location policy database. At step 604, control data is sent from the base station to the sensors of the CR subscribers, the sensor control data includes the list of spectrum opportunities and measurements to be performed. The subscribers receive the sensor control data and begin sensing one or more spectrum opportunities from the list of spectrum opportunities at 606, the CR subscribers generate sensing feedback information in response thereto. Included within the step of sensing spectrum opportunities are the actual sensing measurements taken by the mobile subscriber's sensor which may be for example, radiometric sensing measurements, delay multiply measurements, cylcostationary measurements to name a few. The CR subscriber then sends the sensing feedback information back to the CR base station at 608 where sensing results from various devices are combined and compared at 610. For example, sensing results from two or more distributed sensors can be combined and compared. The base station then ranks and weights the comparison results at 612, thereby generating a ranked channel list and updated sensor controls. The channel ranking list and updated sensor controls are then transmitted at 614 to the CR subscribers thereby providing sensor control and management of the subscribers in a cooperative manner. Steps 602 through 614 are iteratively performed to maintain an updated channel ranking list and updated sensor control data based on current conditions of the network.

The channel ranking and management control technique 600 can be viewed as an iterative multistage process in which channel ranking and control data are obtained, sensing is performed, sensed feedback information is compared and channels are ranked and weighted. The iterative multistage process lends itself well to cardinal and ordinal ranking of which details are now described via steps 616-638. Beginning at 616 (which is a breakdown of 602), the CR base station obtains a list of channels at 616 along with predetermined operating parameters at 618. The list of channels and predetermined operating parameters, such as service requirements, maximum allowed transmit power and usable channel bandwidth may be obtained from the geo-location database.

The first three parameters (service requirement, maximum transmit power and usable channel bandwidth) are combined at 620 to disqualify channels. Each channel is checked as to whether it satisfies all of the requirements of the operating parameters at 620. Channels that do not meet the requirements are removed from the list at 622. The channels that do not satisfy the minimum required criteria are considered not available for opportunistic use and are not considered further in the ranking or sensing.

Another comparison 624 considers the discrete variables from the cooperative sensing engine 202. These variables include a check to see if another wireless mobile, digital television (DTV) or orthogonal frequency domain multiplexed (OFDM) device is detected at 624. If any of the channels have one of these conditions set to true, then the channel is considered occupied at the moment and will be ranked at the bottom of the list. The channel will not be considered for sensing control until a predetermined time (t) has expired.

The remaining channels are subjected to sensing measurement threshold comparisons, shown in this embodiment as radiometric measurements, at 628. The radiometric measurement may be, for example energy level across the channel, signal quality, channel usage, channel propagation characteristics and/or other measurable radio metric(s). If the measured value is less than the threshold, the channel is considered to be a valid channel for opportunistic use. If the channel exceeds the threshold, then an assumption is made that a secondary user is on the channel. Alternatively, other types of sensing measurements can be performed and compared, such as delay multiply or cylcostationary measurement.

The channels that pass the radiometric threshold test are ranked, for example in descending order in terms of energy level. An ordinal value is preferably assigned with the top channel receiving a value of 1, the next channel a value of 2, and so on. The channels that did not pass the radiometric threshold are assigned the highest ordinal value. Therefore, the higher the ordinal value, the lower the ranking (less desirable) the channel.

Moving to the next state, the channels are ranked based on the radiometric measurements—this ranking is preferably given the most weight at 632. Weights are assigned to the ranking criteria and not to the channel itself. The weighting can also vary depending on the type of measurement being performed. For example, correlation measurements may be given more weight than signal quality measurements.

Moving to the next stage, a higher weight is given to the newest measurements, while older measurements are assigned lower weights. Basically, the older measurements are considered less reliable as time goes on, so higher weight is given to the newer measurements at 634. The age (time stamp) of radiometric or any other form of sensing measurement is used as another weight.

Entering the next stage, entropy of the radiometric measurements in each channel is calculated. The channels are then ranked based on entropy weight at 636. Finally, at the last stage, the sum of the values from the previous rankings is used to re-rank the channels at 638.

An example of the entropy calculation of step 636 is provided as follows. The certainty of the behavior of each channel may be determined by dividing the channel energy distributions into configurable bins, with each bin having different probability. The number of bins is a configurable value and can be configured by system designers based on the channel bandwidth, band, terrain and type of incumbents. The entropy is calculated as:

$$H(X) = -\Sigma_{i=1,N} p(x_i) \log_2 p(x_i).$$

Where $H(X)$ is the entropy, $p(x_i)$ is the probability of belonging to the particular energy level bin by energy level $x_i$, and N is the number of different energy level used in calculations.

The entropy is given medium weight. For the entropy stage the last multiple radiometric measurements are used. For example, the energy level (RSSI) can be assigned into energy level bins and the probability of belonging to one of these bins is used to calculate entropy. The channels are ranked in descending order of entropy level and assigned an ordinal value. Channel entropy is assigned another weight in making the ranking decision.

Applying the above to the weighting step 638, the sum of the values from the previous rankings is used to re-rank the channels. Thus, the ranking value of a channel is:

$$R = \text{EnergyRank} * W_{ER} + \text{Age} * W_A + \text{Entropy} * W_E.$$

where EnergyRank is the ranking of the channel based on the sensed energy levels, $W_{ER}$ is the weight assigned to the EnergyRank, Age is the age of radiometric measurement, $W_A$ is the weight assigned to the Age, Entropy is $H(X)$, entropy of the channel energy measurements, and finally $W_E$ is the weight assigned to Entropy.

The channels are then ranked in descending order. The ranking is then transmitted 104 from the base station (access point/master node) as sensor control data to the mobile subscribers 108 and for scheduling quiet period blocks for the least desirable channels.

Hence the technique 600 goes through several channel ranking stages (ranking based on sensor measurements, ranking based on age of past measurements, and ranking again based on entropy) with each of these ranking stages being weighted based on importance of the ranking criteria to the overall process of spectrum opportunity detection to achieve the final ranking which is sent from the base station to the mobile subscribers.

Once the channels have been sensed and ranked, future sensing is controlled to maintain knowledge of channel availability using minimal system resources via quiet period scheduling. In order to obtain sufficient sensing data for channel ranking as well as conserve battery power and computational power as well as wireless bandwidth (taken up by sensing control and data messages), the sensing control and management technique 600 is further provided with a quiet period scheduling technique 700.

Figure 7:
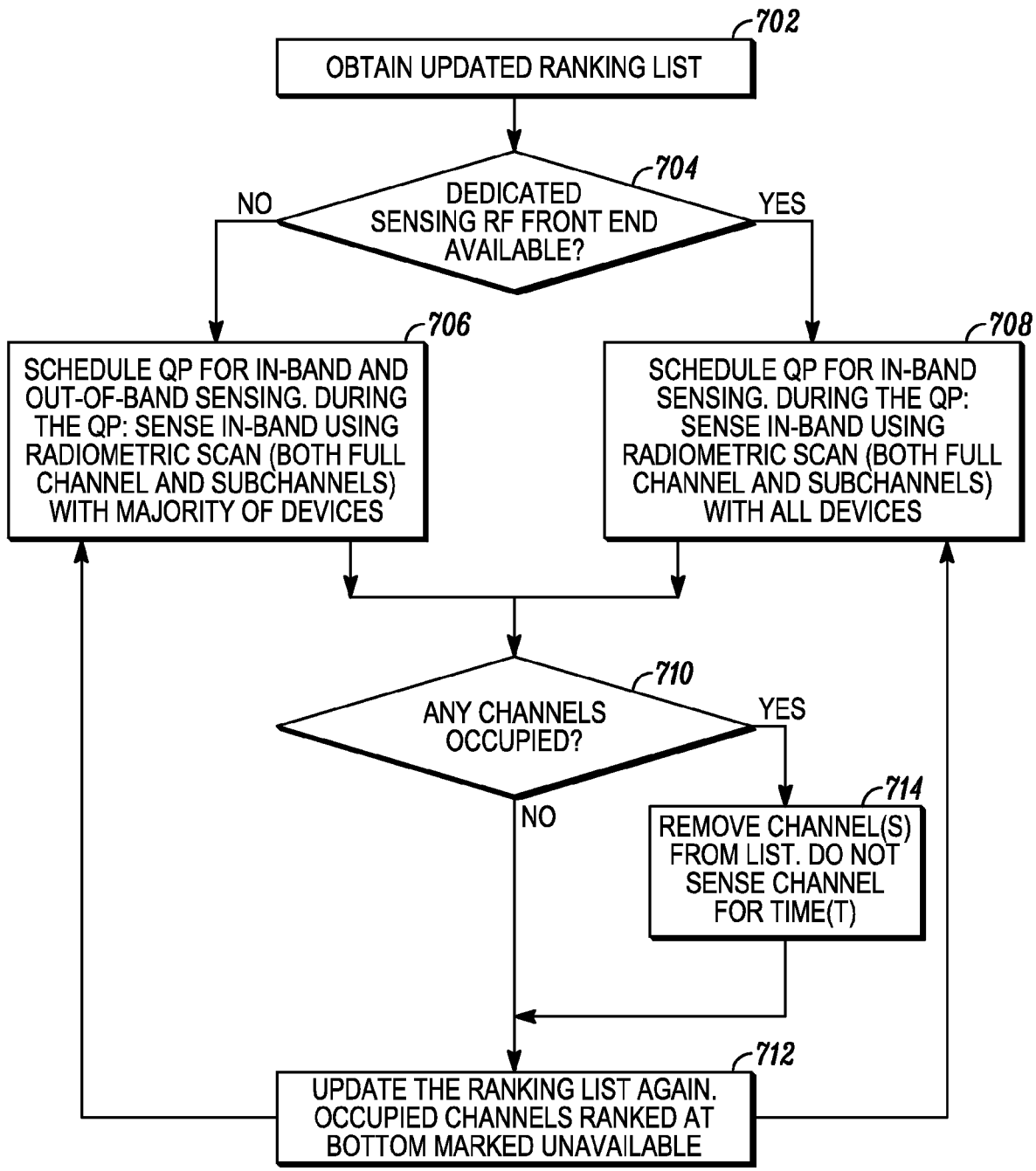
FIG. 7 is a flowchart of a method for maintaining and updating the channel ranking list via quiet period scheduling in accordance with an embodiment of the invention.

The quiet period (QP) scheduling provides the length of sensing cycle in terms of number of quiet periods. The QP period is set for a sensing cycle and specified in terms of rate using sensing control messages. Referring to FIG. 7 there is shown a flowchart of a method for maintaining and updating the quiet period schedule according based on channel ranking list in accordance with an embodiment of the invention. The technique 700 provides for quiet period (QP) scheduling 700. Quiet period scheduling begins at 702 by obtaining an updated channel ranking list, such as ranked by technique 600. A determination is made at 704 as to whether a dedicated RF front end is available within base station 104. If no dedicated RF front-end is available at 704, the QP technique schedules in-band and out-of-band spectrum sensing at 706. If a dedicated RF front-end is present at 704, then the QP technique schedules in-band sensing at 708.

Moving to 710, a determination is made, based on the results of 706 or 708, as to whether any channels are occupied. The ranking list is updated with the unoccupied channels at 712 with the best channels being ranked at the top of the list. Any channels that are deemed occupied at 710 are removed from the list at 714 and not sensed for a predetermined time "t."

After each ranking update, the top few channels are selected. The selected channels are then sensed in the next sensing round by the most number of devices. These top ranked channels are considered the optimum choice for opportunistic use in a case when the currently used channel needs to be vacated. Middle ranked channels are sensed with medium frequency in order to have reliable information about these channels in a case where one of the top ranked channels is detected as occupied. In the case of a user being detected on a top ranked channel, the best of the middle ranked channels would replace that top ranked channel. Finally, the lowest ranked channels are infrequently sensed in order to confirm their unsuitability and unavailability. The lowest ranked channels may be moved higher on the ranking list and sensed more frequently as the feedback data varies.

For the case of non-dedicated RF front-end (as determined at 708) there is no distinguishing of in-band or out-of-band spectrum sensing—in both cases the task involves scheduling quiet periods (QP) and performing sensing, whether in-band or out-of-band. For the case of a dedicated RF front-end, different schedules can be used for sensing, one for in-band channel (by scheduling QPs for sensing) and one for out-of-band channels at all other times.

For the non dedicated front-end (as determined at 708), during the quiet period the following occurs: sensing of in-band channels occurs using the majority of mobile subscriber devices; sensing the top ranked out-of-band channels occurs using most of the remaining mobile subscriber devices to sense for DTV signals using, for example match filtering or other suitable DTV sensing means; sensing for OFDM occurs using delay multiply or any other suitable OFDM sensing means. The middle ranked channels are sensed using fewer devices, and the bottom ranked channels are sensed with the fewest devices (or not sensed at all). A predetermined period of time "t" is set within which to sense, by at least one device, any channel that has not been sensed.

Scheduling the QP for in-band sensing encompasses sensing the in-band channel and subchannels with all mobile subscriber devices 108. In-band channels for DTV signals can be sensed via match filtering or the like. In parallel: the top ranked out-of-band channels are sensed using the most of the mobile subscriber devices. The middle ranked channels are sensed with fewer devices. The bottom ranked channels are sensed with the fewest devices. If any channel has not been sensed for a predetermined period of time "t" then have that channel sensed by at least one device. OFDM signals can be sensed by using delay multiply or any other suitable OFDM sensing algorithm Accordingly there has been provided a channel ranking and management technique based on distributed sensor control for use by secondary systems seeking to utilize spectrum controlled by a primary system or other secondary system. The channel ranking and management provide the advantages of cooperation of sensing devices to achieve higher detection rates and lower false alarms rates using the same sensing resources. Sufficient sensing data for channel ranking is obtained while battery power and computational power are conserved using minimal wireless bandwidth.

The cooperative sensing technique, as provided by the various embodiments of the invention, allows systems having highly geographically spread out and mobile type devices to rank and update channel rankings in a reliable fashion. The iterative ranking of the channels through the use of weighted multistage assignments provides for a dynamic channel ranking list. The use of sensed channel information, including radiometric measurements, age of measurements of the sensed channels, and calculated entropy can all be assigned different weights with allows for adjustable and flexible channel management using minimum sensing resources. The updated channel ranking lists permit the optimized utilization of spectral white space by secondary systems.

Additionally, by determining whether channel sensing is being performed by a dedicated RF front end or not, quiet periods can be scheduled for either in-band-only sensing or both in-band and out-of-band sensing. By sensing for channels during quiet periods the channel ranking list can be updated and maintained in an efficient manner making very little demands on the network.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Those skilled in the art will appreciate that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for spectrum sensing management and control in a cognitive radio (CR) system with a CR base station and CR subscribers having sensors, comprising:
   obtaining a list of spectrum opportunities and predetermined operating parameters from a geo-location policy database;
   sending sensor control data to the sensors of the CR subscribers, the sensor control data including the list of spectrum opportunities and sensor configuration;
   sensing one or more spectrum opportunities from the list of spectrum opportunities at the CR subscribers based on the sensor control data received from the CR base station, the CR subscriber generating sensing feedback information in response thereto;
   sending the sensing feedback information back to the CR base station;
   combining the sensing results received in various sensing feedback information and comparing to the predetermined operating parameters obtained from the geo-location policy database;
   ranking the spectrum opportunities by the CR base station based on a multistage ranking technique thereby generating a ranked channel list and updated sensor control data; and
   transmitting the ranked channel list and updated sensor control data to the CR subscribers thereby providing sensor control and management.

2. The method of claim 1, further comprising:
   taking one or more sensing measurements on opportunity channels within the list of spectrum opportunities; and
   initially ranking the one or more sensing measurements taken on the opportunity channels of the list of spectrum opportunities.

3. The method of claim 2, further comprising:
   calculating entropy from a predetermined number of sensing measurements being taken; and
   generating a secondary ranking based on the calculated entropy.

4. The method of claim 3, wherein the ranking further comprises generating a final ranking based on weighted combined rankings of the sensing measurements.

5. The method of claim 4, wherein the ranking further comprises generating a final ranking based on weighted combined rankings of sensing measurements and entropy.

6. The method of claim 5, wherein the sensing measurements of the opportunity channels comprises one of more of: radiometric measurements, matched filter measurements, and delay multiply measurements taken on the opportunity channels.

7. The method of claim 1, further comprising determining the sensor control data for each-channel based on the ranking.

8. The method of claim 1, wherein the sensor control data comprises one or more of:
   type of sensing and how often to sense;
   how often the sensor should sense;
   how the sensor should sense;
   type of information;
   type of incumbent to be detected;
   sensor RF configuration;
   sensing algorithms and settings to be used;
   sensor location, velocity and measurement confidence; and
   quiet period duration and rate.

9. The method of claim 1, wherein the multistage ranking technique includes:
   ranking the spectrum opportunities based on age of sensing measurements taken on opportunity channels of the of spectrum opportunities;
   ranking the spectrum opportunities based on entropy calculated from the sensing measurements;
   weighting each ranking based on a predetermined weighting factor;
   generating a final ranking of channels based on a combined weighted ranking of the spectrum opportunities;
   determining sensor control based on the final ranking of channels; and
   transmitting the final ranking of channels and sensor control from the CR base station to the CR subscribers.

10. The method of claim 9, further comprising disqualifying channels and removing the disqualified channels from the ranked channel list.

11. A communication network, comprising:
   an incumbent system;
   a cognitive radio (CR) system, the CR system having at least one CR base station and at least one CR mobile subscriber, the CR system seeking to utilize the incumbent system's spectrum;
   a centralized sensing decision engine (CSDE) for transmitting a channel list and sensor control information from the CR base station to each mobile CR mobile subscriber;
   a decentralized sensing engine (DSE) for receiving the sensor control information and channel list and providing sensed channel information in response thereto; and
   the CSDE receiving the sensed channel information, the CSDE iteratively scanning, ranking, and managing the channel list to provide a highest ranked set of channels and updated sensor control information with which the CR mobile subscriber can operate within the incumbent's spectrum.

12. The communication network of claim 11, wherein the CSDE provides iterative ranking by using weighted multistage cardinal and ordinal assignments of sensing measurements of the sensed channels, age of measurements of the sensed channels and calculated entropy of the sensed measurements.

13. The communication network of claim 11, wherein the channel list is initially obtained from a geo-location database.

14. The communication network of claim 11, wherein the sensor control information includes which channel a CR mobile subscriber sensor should sense, how often the sensor should sense; and identifies a technique with which the sensor should sense.

15. The communication network of claim 11, wherein the sensor control information provides a schedule for quiet periods within which the CR mobile subscribers sense both in-band and out-of-band channels regardless of ranking.

16. A method for spectrum sensing management and control for a secondary communication system seeking to utilize another communication system's spectrum, comprising:
    obtaining a channel list and service requirements;
    determining which channels satisfy the service requirements and removing those which do not satisfy the service requirements from the channel list;
    providing the channel list;
    providing control information for sensing;
    sensing if a user from the other system is operating on any of the channels of the channel list;
    sensing if secondary users from other secondary systems are operating on the channels of the channel list;
    taking sensing measurements of channels being operated on by the secondary users;
    ranking the channels based on the sensing measurements into an initial ranked channel list;
    determining an age for the sensing measurements;
    ranking the channels based on the age of the sensing measurements into a secondary ranked channel list;
    weighting the initial ranked channel list and the secondary ranked channel list; and
    re-ranking the channels according to the weighting into a final ranking list.

17. The method of claim 16, further comprising:
    updating the control information for sensing in response to the re-ranking.

18. The method of claim 16, further comprising, after the step of determining the age of the sensing measurements:
    determining the number of sensing measurements taken;
    calculating entropy when a sufficient number of sensing measurements have been taken to perform an entropy calculation; and
    ranking the channels based on the calculated entropy into a third ranking list; and
    weighting the initial, secondary and third rankings lists.

19. The method of claim 16, further comprising:
    determining whether the channel sensing is performed by a dedicated RF front end;
    scheduling quiet periods for in-band-only sensing when a dedicated RF front is determined;
    scheduling quiet periods for in-band and out-of-band sensing when no dedicated RF front is determined;
    sensing if any of the channels are occupied for in-band only quiet periods;
    sensing if any channels are occupied for in-band and out-of-band quiet periods; and
    updating the final ranking list by ranking occupied channels lowest such that the lowest ranked channels are not sensed for a predetermined amount of time.

20. A method for spectrum sensing management in a cognitive radio (CR) system, comprising the steps of:
    performing sensing measurements within a frequency spectrum based on received sensing control information;
    ranking radio channels based on the sensing measurements:
    ranking the radio channels based on entropy of the sensing measurements;
    weighting each ranking based on predetermined weighting factors associated with a sensing measurement type of the sensing measurements; and
    generating a final ranking based on a combined weighted ranking of the radio channels, the final ranking being used by the CR system to utilize spectrum of an incumbent system.

21. The method of claim 20, wherein the steps of performing through generating are iteratively processed to maintain an updated final ranking.

22. The method of claim 21, wherein the sensing measurement comprises at least one of: a radiometric sensing measurement, delay multiply measurement, matched filter measurement or cylcostationary measurement.

23. The method of claim 22, wherein ranking the radio channels based on entropy of the sensing measurement comprises ranking radio channels based on age of sensing measurements.

24. The method of claim 20, wherein the sensing control information comprises sensor configuration data including one or more of:
    a spectrum opportunity list identifying which frequency and bandwidth to sense;
    an identification of the type of incumbent to be detected;
    a sensing algorithm to be used;
    type of sensing and how often to sense;
    how often the sensor should sense;
    how the sensor should sense;
    type of information to be sensed;
    type of incumbent to be detected;
    sensor RF configuration;
    sensing algorithms and settings to be used;
    sensor location, velocity and measurement confidence; and
    quiet period duration and rate.

25. The method of claim 20, wherein the step of ranking radio channels based on the sensing measurements further comprises combining sensing measurement results from two or more distributed sensors.

\* \* \* \* \*

UNITED STATES PATENT AND TRADEMARK OFFICE
CERTIFICATE OF CORRECTION

| | |
|---|---|
| PATENT NO. | : 8,150,328 B2 |
| APPLICATION NO. | : 12/212101 |
| DATED | : April 3, 2012 |
| INVENTOR(S) | : Chaudhri et al. |

It is certified that error appears in the above-identified patent and that said Letters Patent is hereby corrected as shown below:

In Column 2, Line 64, delete "GHz)." and insert -- GHz); --, therefor.

In Column 3, Line 7, delete "spectrum." and insert -- spectrum; --, therefor.

In Column 3, Line 34, delete "operation" and insert -- operation; --, therefor.

In Column 3, Line 45, delete "user;" and insert -- user. --, therefor.

In Column 4, Line 44, delete "decision sensing" and insert -- sensing decision --, therefor.

In Column 7, in Table 2, under "Description", in Line 4, delete "requirements" and insert -- requirements. --, therefor.

In Column 9, Lines 1-2, delete "cylcostationary" and insert -- cyclostationary --, therefor.

In Column 9, Line 59, delete "cylcostationary" and insert -- cyclostationary --, therefor.

In Column 12, Line 10, delete "algorithm" and insert -- algorithm. --, therefor.

In Column 14, Line 23, in Claim 9, delete "of the of" and insert -- of the list of --, therefor.

In Column 16, Lines 11-12, in Claim 20, delete "measurements:" and insert -- measurements; --, therefor.

In Column 16, Line 28, in Claim 22, delete "cylcostationary" and insert -- cyclostationary --, therefor.

Signed and Sealed this
Eighth Day of January, 2013

David J. Kappos
*Director of the United States Patent and Trademark Office*